United States Patent
Nakamura

(10) Patent No.: US 10,172,188 B2
(45) Date of Patent: Jan. 1, 2019

(54) COOKING HEATER

(71) Applicant: Sharp Kabushiki Kaisha, Sakai-shi, Osaka (JP)

(72) Inventor: Tatsuhiko Nakamura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 86 days.

(21) Appl. No.: 15/116,529

(22) PCT Filed: Sep. 2, 2015

(86) PCT No.: PCT/JP2015/075000
§ 371 (c)(1),
(2) Date: Aug. 4, 2016

(87) PCT Pub. No.: WO2016/035833
PCT Pub. Date: Mar. 10, 2016

(65) Prior Publication Data
US 2016/0345388 A1    Nov. 24, 2016

(30) Foreign Application Priority Data
Sep. 4, 2014  (JP) ................................. 2014-180283

(51) Int. Cl.
*H05B 6/78* (2006.01)
*F27D 11/00* (2006.01)
(Continued)

(52) U.S. Cl.
CPC ............ *H05B 6/6411* (2013.01); *A47J 36/16* (2013.01); *F24C 7/02* (2013.01); *F24C 15/02* (2013.01);
(Continued)

(58) Field of Classification Search
CPC .. H05B 6/6402; H05B 6/6411; H05B 6/6414; H05B 6/642; H05B 6/6426;
(Continued)

(56) References Cited

U.S. PATENT DOCUMENTS

| 4,539,455 A | * | 9/1985 | Colato | H05B 6/6408 |
| | | | | 219/763 |
| 4,595,827 A | * | 6/1986 | Hirai | F24C 7/08 |
| | | | | 219/754 |
| 2010/0133263 A1 | | 6/2010 | Toyoda et al. | |

FOREIGN PATENT DOCUMENTS

| JP | 55-17900 B2 | 5/1980 |
| JP | 57-122694 U | 7/1982 |

(Continued)

OTHER PUBLICATIONS

Official Communication issued in International Patent Application No. PCT/JP2015/075000, dated Nov. 2, 2015.

*Primary Examiner* — Hung D Nguyen
(74) *Attorney, Agent, or Firm* — Keating & Bennett, LLP

(57) ABSTRACT

A cooking heater (1) of the present invention includes a cooking heater body (2) which includes a heating chamber; a drawing body (3) which is configured to be allowed to be pulled out of the cooking heater body (2) and pushed into the cooking heater body (2); a rotating tray (22) which is arranged inside the drawing body (3) and which is configured to be allowed to be mounted to the drawing body and removed from the drawing body; a rotating tray drive motor (25) which is provided in the cooking heater body (2); and a rotation transmission mechanism (29) which, with the drawing body (3) being pushed into the cooking heater body (2), transmits rotational force from the rotating tray drive motor (25) to the rotating tray (22) and, with the drawing
(Continued)

body (3) being pulled out of the cooking heater body (2), blocks the transmission of the rotational force to the rotating tray (22).

13 Claims, 12 Drawing Sheets

(51) Int. Cl.
*H05B 6/64* (2006.01)
*F24C 7/02* (2006.01)
*F24C 15/02* (2006.01)
*F24C 15/16* (2006.01)
*A47J 36/16* (2006.01)
*H05B 6/80* (2006.01)

(52) U.S. Cl.
CPC ........... *F24C 15/16* (2013.01); *H05B 6/6414* (2013.01); *H05B 6/80* (2013.01)

(58) Field of Classification Search
CPC .... H05B 6/6429; H05B 6/6482; H05B 6/763; H05B 6/80; F24C 7/02; F24C 7/04; F24C 7/08; F24C 15/02; F24C 15/022; F24C 15/027; F24C 15/16; F24C 15/162; F24C 15/168; F24C 15/18; F24C 15/36; A47J 36/16
USPC ....... 219/385, 386, 391, 392, 394, 400, 403, 219/521, 681, 722, 725, 739, 749–754, 219/756, 762, 763
See application file for complete search history.

(56) References Cited

FOREIGN PATENT DOCUMENTS

| JP | 2010-127561 A | | 6/2010 |
|---|---|---|---|
| JP | 2013-100945 A | | 5/2013 |
| JP | 2013-100946 A | | 5/2013 |
| JP | 2013-100947 A | | 5/2013 |
| JP | 2013-100960 A | | 5/2013 |
| JP | 2013-100961 A | * | 5/2013 |

* cited by examiner

COOKING HEATER

TECHNICAL FIELD

The present invention relates to a cooking heater.

This application claims priority from Japanese Patent Application No. 2014-180283, filed in Japan on Sep. 4, 2014; the entire contents of which are incorporated herein by reference.

BACKGROUND ART

A cooking heater having a drawing body integral with an open/close door is being proposed in the state of the art in the field of cooking heaters such as microwave ovens. A material to be heated may be brought into or out of the cooking heater with the drawing body being pulled out to the front face of the cooking heater. Thus, the cooking heater is easy to use when it is applied to a large-sized cooking heater which is embedded into a built-in kitchen, for example. On the other hand, a cooking heater which is provided with a rotating tray is favored by users from viewpoints such as the ease of uniform heating, the capability to observe the whole periphery of the material to be heated during cooking when it is provided with a window which can visually recognize the inside of the cooking heater. Such a cooking heater which is provided with both the drawing body and the rotating tray is disclosed in PATENT DOCUMENT 1, for example.

CITATION LIST

Patent Document

[PATENT DOCUMENT 1] JP2010-127561A

DISCLOSURE OF THE INVENTION

Problems to be Solved by the Invention

When using the cooking heater, heated food, for example, may flow out of a dish or container to stain the rotating tray. However, there is a problem with the cooking heater disclosed in PATENT DOCUMENT 1 that it is difficult to easily clean the rotating tray, which is fixed to the cooking heater body.

One embodiment of the present invention is to provide a cooking heater which is provided with both a drawing body and a rotating tray to allow the rotating tray to be cleaned easily.

Means for Solving the Problems

A cooking heater according to one embodiment of the present invention includes a cooking heater body which includes a heating chamber; a drawing body which is configured to be allowed to be pulled out of the cooking heater body and pushed into the cooking heater body; a rotating tray which is arranged inside the drawing body and which is configured to be allowed to be mounted to the drawing body and removed from the drawing body; a rotation drive source which is provided in the cooking heater body; and a rotation transmission mechanism which, with the drawing body being pushed into the cooking heater body, transmits rotational force from the rotation drive source to the rotating tray and, with the drawing body being pulled out of the cooking heater body, blocks the transmission of the rotational force to the rotating tray.

In the cooking heater according to one embodiment of the present invention, the rotating tray may be configured to be allowed to be raised and lowered in cooperation with a pulling-out operation and a pushing-in operation of the drawing body.

In the cooking heater according to one embodiment of the present invention, with the drawing body being pulled out of the cooking heater body, the rotating tray may be in contact with a bottom plate of the drawing body; and, with the drawing body being pushed into the cooking heater body, the rotating tray may be disposed above the bottom plate.

In the cooking heater according to one embodiment of the present invention, the rotation transmission mechanism may include a drive gear which is connected to the rotation drive source and a follower gear which is connected to the rotating tray, and the drive gear may be mutually engaged with the follower gear, with the drawing body being pushed into the cooking heater body.

In the cooking heater according to one embodiment of the present invention, the drive gear may include a support which includes an inclined face, and the follower gear may be configured to be raised to a height at which the follower gear engages with the drive gear while being in contact with the inclined face in conjunction with the pushing-in operation of the drawing body.

In the cooking heater according to one embodiment of the present invention, the rotating tray may include a follower shaft which is connected to the follower gear and a bearing member which rotatably supports the follower shaft and the bearing member may be supported to the bottom plate of the drawing body.

In the cooking heater according to one embodiment of the present invention, the rotation transmission mechanism may include a drive shaft which is connected to the rotation drive source; a follower shaft which is connected to the rotating tray; and a clutch mechanism which switches between connecting and disconnecting of the drive shaft and the follower shaft, and the drive shaft and the follower shaft may be mutually connected with the drawing body being pushed into the cooking heater body.

In the cooking heater according to one embodiment of the present invention, the clutch mechanism may include a detector which detects that the drawing body is being pushed into; and a controller which controls an operation of the drive shaft such as to connect the drive shaft to the follower shaft with the drawing body being pushed into in accordance with detection results of the detector.

In the cooking heater according to one embodiment of the present invention, the drawing body may include a position regulating member which regulates a position of the rotating tray relative to the drawing body.

In the cooking heater according to one embodiment of the present invention, the rotating tray may include a leg which projects from the bottom face of the rotating tray.

A cooking heater according to one embodiment of the present invention includes a cooking heater body which includes a heating chamber; a drawing body which is configured to be allowed to be pulled out of the cooking heater body and pushed into the cooking heater body; a rotating tray which is arranged inside the drawing body and which is configured to be allowed to be mounted to the drawing body and removed from the drawing body; a rotation drive source which is provided in the cooking heater body; and a controller which controls an input to the rotation drive source and switches rotating of the rotating tray, wherein the rotating tray is configured to not rotate with the drawing body pulled out of the cooking heater body.

Effects of the Invention

An embodiment of the present invention makes it possible to realize a cooking heater which is provided with both a drawing body and a rotating tray to allow the rotating tray to be cleaned easily.

BRIEF DESCRIPTION OF THE DRAWINGS

FIG. 5 is a cross-sectional diagram illustrating the cooking heater with the drawing body being pushed in;

FIG. 11 is a cross-sectional diagram illustrating the cooking heater with the drawing body being pushed in;

FIG. 13 is a cross-sectional diagram illustrating the cooking heater according to the fifth embodiment, with the drawing body being pushed in;

FIG. 15 is a cross-sectional diagram illustrating the cooking heater according to the sixth embodiment, with the drawing body being pushed in.

MODE FOR CARRYING OUT THE INVENTION

First Embodiment

Below, a first embodiment of the present invention is described using FIGS. 1 to 5.

A cooking heater according to the first embodiment is one example of a drawing-type cooking heater which is preferably used in a form such as to be embedded into a built-in kitchen, etc., for example.

Figure 1:
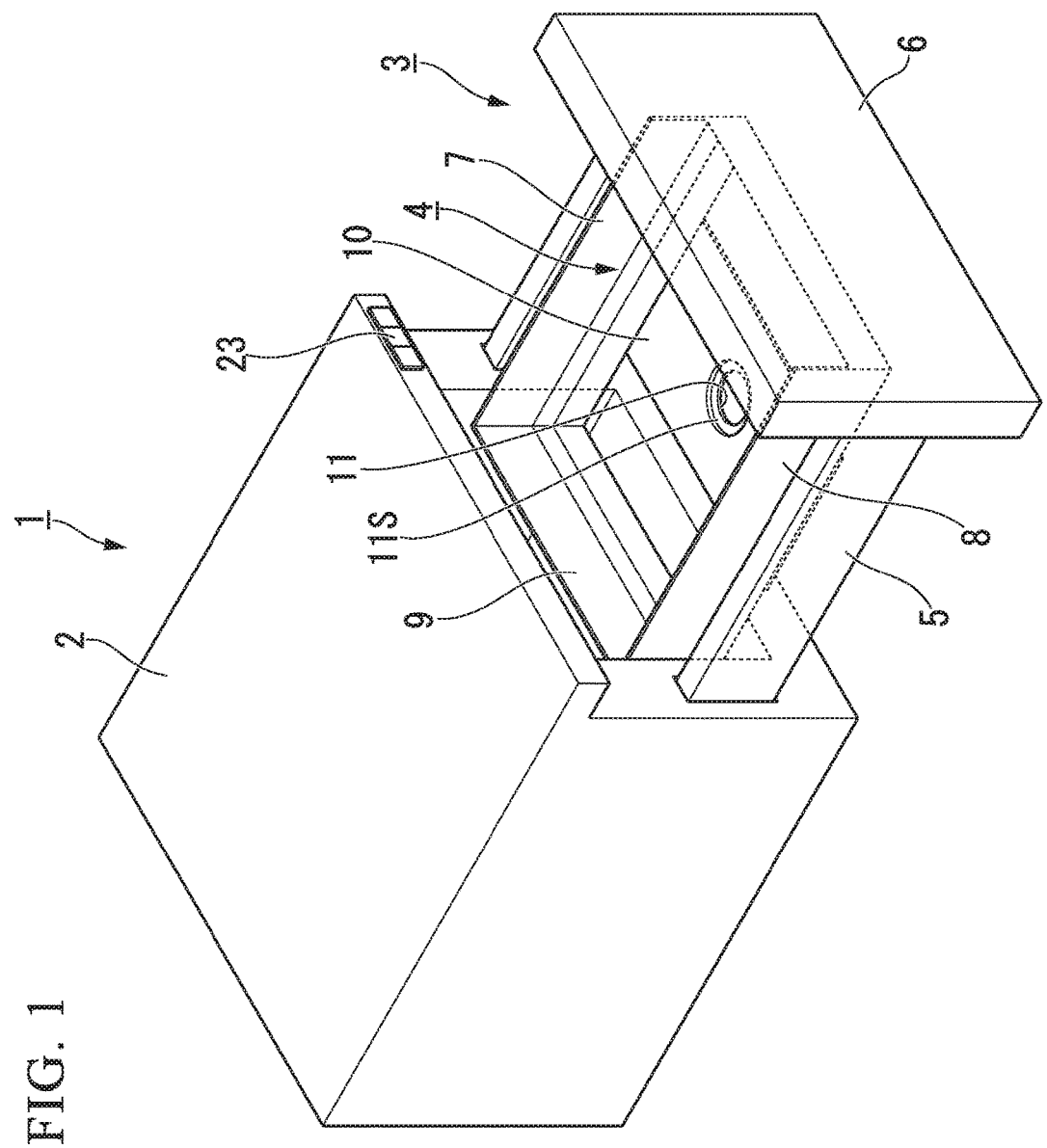
FIG. 1 is a perspective view illustrating a cooking heater according to a first embodiment.
Figure 2:
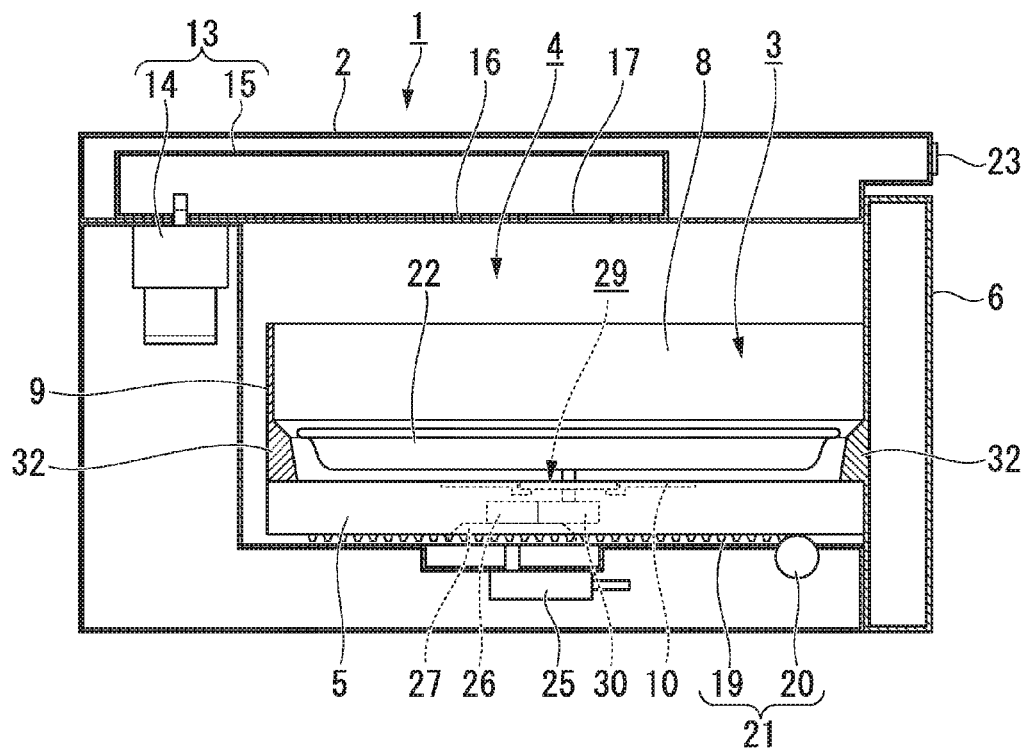
FIG. 2 is a cross-sectional diagram illustrating a schematic configuration of the cooking heater.

FIG. 1 is a perspective view illustrating the cooking heater according to a first embodiment. FIG. 2 is a cross-sectional diagram illustrating a schematic configuration of the cooking heater.

To facilitate better viewing of each of constituting elements in each of the drawings below, the dimensions of the constituting elements may be shown with scales varying from one constituting element to another.

As shown in FIG. 1, a cooking heater 1 according to the present embodiment includes a cooking heater body 2; a drawing body 3; a rotating tray; a motor (a rotation drive source); and a rotation transmission mechanism. The rotating tray, motor, and rotation transmission mechanism that are not shown in FIG. 1 will be described in detail later.

The cooking heater body 2 includes a heating chamber 4 for heating and cooking a material to be heated, such as food. The drawing body 3 can be pulled out of or pushed into the cooking heater body 2. The drawing body 3 houses the rotating tray on which the material to be heated is placed, such as a dish or container on which the food is placed. The rotating tray is arranged inside the drawing body 3 and can be mounted to or removed from the drawing body 3.

The cooking heater 1 includes a slide rail 5 as a moving mechanism for bringing the drawing body 3 in and out of the cooking heater body 2. The drawing body 3 includes an open/close door 6 for opening and closing the heating chamber 4; and a heating container 7, on which the material to be heated is placed to house the placed material to be heated. The heating container 7 includes side plates 8, a back plate 9, and a bottom plate 10. The bottom plate 10 is provided such as to be bridged between the two opposing side plates 8. A circular bore 11 is provided at the center of the bottom plate 10. The bore 11 is for inserting therethrough the below-described follower shaft and follower gear. A step 11s into which the below-described bearing member is engaged is provided on the periphery of the bore 11. In this way, a portion of the bottom face of the heating container 7 is closed with the bottom plate 10, while the other portions are open. The open/close door 6 is mounted on the front face side of the heating container 7, while the upper portion of the heating container 7 is open.

When the drawing body 3 is pushed into the cooking heater body 2, the opening on the front face of the heating chamber 4 is closed by the open/close door 6. Then, the interior space of the heating chamber 4 is a sealed space surrounded by the drawing body 3 and an inner-wall face of the cooking heater body 2. The open/close door 6 of the drawing body 3 is supported to the cooking heater body 2 via the slide rail 5. The slide rail 5 includes a fixed rail; and a movable rail which slide along the fixed rail. This configuration makes it possible for the slide rail 5 to expand and contract.

As shown in FIG. 2, a microwave generation device 13 is provided in the upper portion and in the rear portion of the heating chamber 4 in the cooking heater body 2. The microwave generation device 13 includes a magnetron 14 and a waveguide 15. The magnetron 14 generates microwaves. The waveguide 15 propagates the microwaves generated by the magnetron 14 to the heating chamber 4. The magnetron 14 is arranged in the rear portion of the heating chamber 4. The waveguide 15 is arranged in the upper portion of the heating chamber 4.

The microwaves generated by the magnetron 14 propagates within the waveguide 15 to be guided to the upper portion of the heating chamber 4, after which they are radiated to the inside of the heating chamber 4 from a feed inlet 17 which is provided on a top plate 16 of the heating chamber 4. Thus, the microwaves supplied to the inside of the heating chamber 4 heats the material to be heated that is housed in the heating container 7 to perform cooking. Moreover, a grill heater (not shown) is provided in the upper portion of the heating chamber 4.

The drawing body 3 is provided with a rack 19. The rack 19 engages with a pinion gear (not shown) which is mounted to a rotating shaft of a drawing body driving motor (a DC motor) 20 which is a driving unit for moving the drawing body 3. In this way, the cooking heater 1 is provided with a mechanism for automatically moving the drawing body 3, or, in other words, an automatic opening/closing mechanism 21 for automatically opening and closing the open/close door 6. The drawing body driving motor 20 rotates to cause a pinion gear which is mounted to a rotating shaft to rotate and the rack 19 to move linearly in the left/right directions in FIG. 2 in response to the rotating. In response to the moving of the rack 19, the drawing body 3 and the rotating tray both moves. This causes the drawing body 3 to move automatically, and the material to be heated that is placed on the rotating tray 22 also to move in and out of the heating chamber 4 automatically. An operating unit 23 which includes a button for a user to open and close the open/close door 6, and a button for selecting the type of cooking are provided on the front face of the cooking heater 1.

In the present embodiment, an example is shown of a cooking heater in which a user pushes a button to automatically open and close the open/close door 6. The cooking heater of the present invention does not necessarily have to be provided with an automatic opening/closing function of the open/close door 6. For example, it may be configured such that the user manually opens and closes the open/close door 6.

Figure 4:
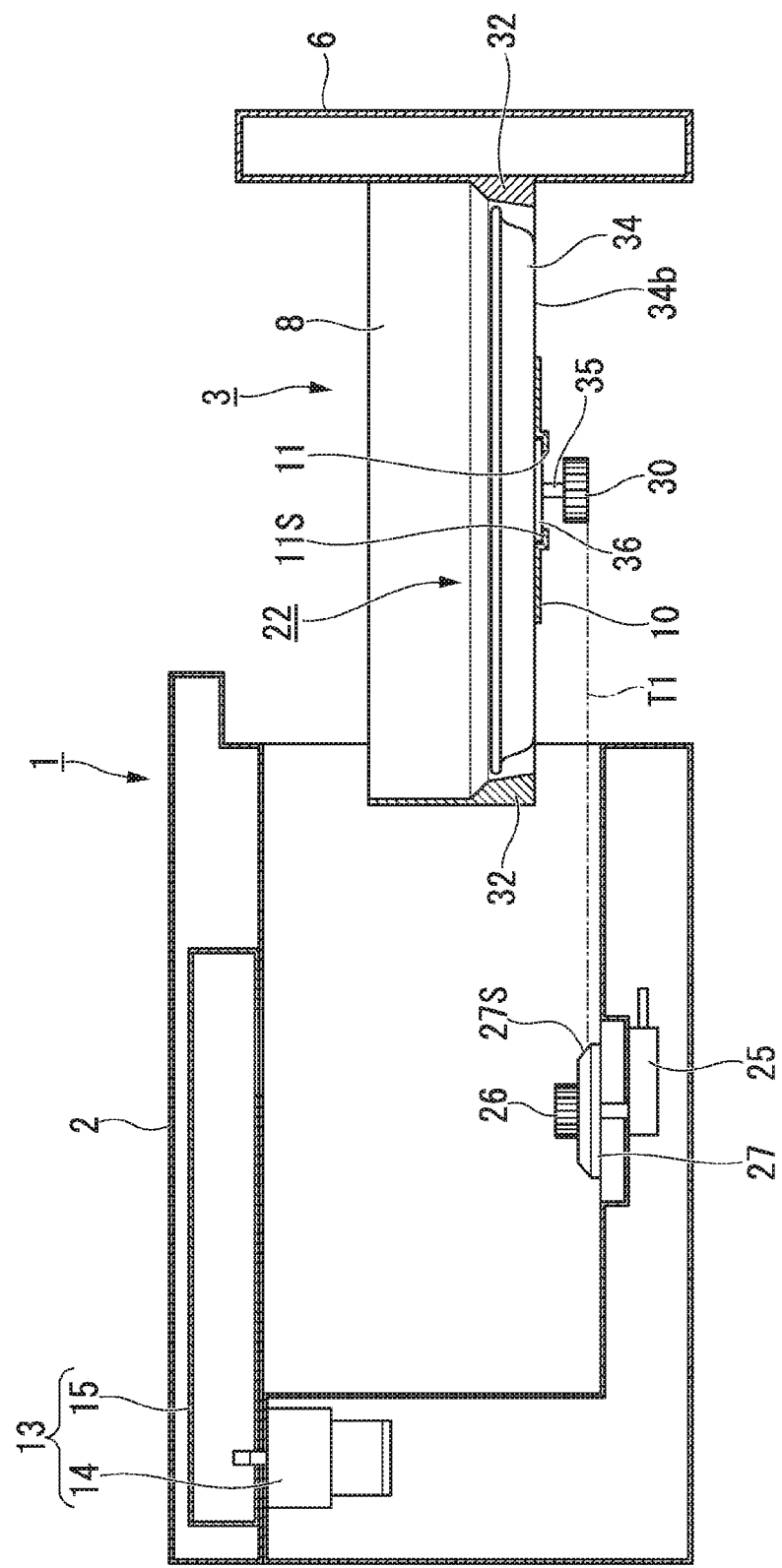
FIG. 4 is a cross-sectional diagram illustrating the cooking heater with a drawing body being pulled out.

The rotating tray driving motor 25 is provided in the cooking heater body 2. In other words, with the drawing body 3 being pulled out of the cooking heater body 2, the rotating tray driving motor 25 is located within the cooking heater body 2. A drive gear 26 which makes up the rotation transmission mechanism is provided in the rotating tray driving motor 25. As shown in FIG. 4, a support 27 is provided below the drive gear 26. The support 27, which is a circular plate member, includes an inclined face part 27s whose thickness becomes thinner from the center portion to the peripheral edge portion.

The rotating tray driving motor 25 according to the present embodiment corresponds to the claimed rotation drive source.

The cooking heater 1 includes a rotation transmission mechanism 29 which transmits the rotational force of the rotating tray driving motor 25. More specifically, the rotation transmission mechanism 29 transmits the rotational force from the rotating tray driving motor 25 with the drawing body 3 being pushed into the cooking heater body 2 and blocks transmission of the rotational force from the rotating tray driving motor 25 to the rotating tray 22 with the drawing body 3 being pulled out of the cooking heater body 2. The rotation transmission mechanism 29 according to the present embodiment includes the drive gear 26, which is connected to the rotating tray driving motor 25; and a follower gear 30 which is connected to the rotating tray 22. The drive gear 26 and the follower gear 30 engage with each other with the drawing body 3 being pushed into the cooking heater 2. With the operation in which the drawing body 3 is pulled out of the cooking heater 2, the follower gear 30 moves with the rotating tray 22 to separate from the drive gear 26.

While an example is shown in which the drive gear 26 and the follower gear 30 are made from a spur gear, the type of gear is not limited thereto, so that various gears may be used. The drive gear 26 and the follower gear 30 need to perform an operation in which they engage from mutually distant positions, so that a gear in which a part of the teeth are missing, for example, may be used for the engaging operation to be performed more smoothly. In this case, the drive gear may be stopped such that the missing part of the teeth faces the front face side of the cooking heater body 2 to make it easier for the teeth of the follower gear to engage with those of the drive gear when the follower gear approaches the drive gear.

The drawing body 3 includes a tray alignment guide 32 which regulates the position of the rotating tray 22 relative to the drawing body 3. There is a clearance between the inner face of the drawing body 3 and the rotating tray 22, so that a lack of the tray alignment guide 32 would cause determination of the position of the rotating tray 22 relative to the drawing body 3 and the user's placement of the rotating tray 22 at an appropriate position of the drawing body 3 to be difficult. On the other hand, the drawing body 3 may be provided with the tray alignment guide 32 to regulate the position of the rotating tray 22 relative to the drawing body 3 and to allow the user to easily place the rotating tray 22 at an appropriate position of the drawing body 3.

The tray alignment guide 32 according to the present embodiment corresponds to the claimed position regulating member.

Figure 3:
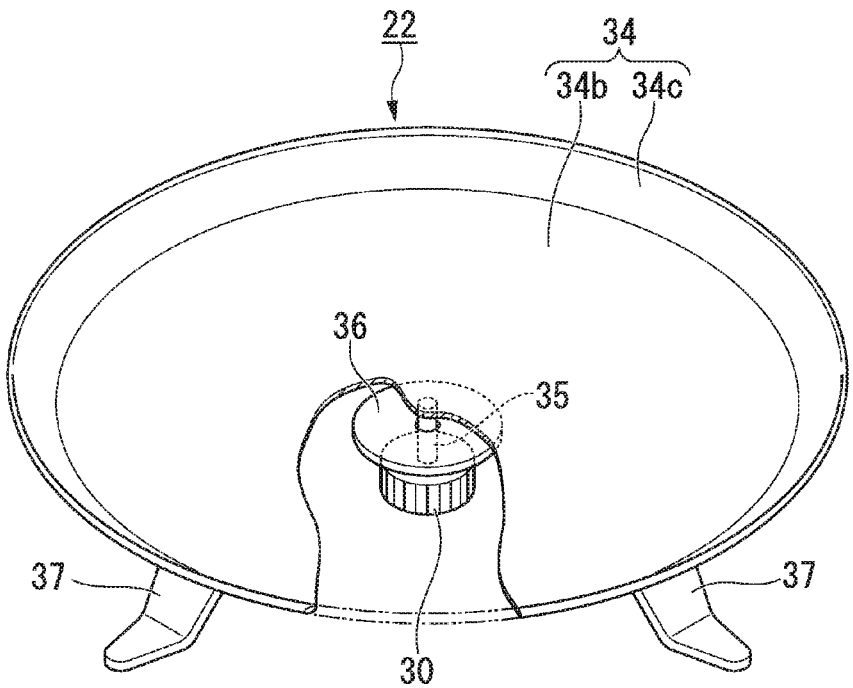
FIG. 3 is a perspective view of a rotating tray.

FIG. 3 is a perspective view of the rotating tray 22. In FIG. 3, to facilitate viewing of the figure, a part of the tray body 34 is shown broken.

As shown in FIG. 3, the rotating tray 22 includes a tray body 34, a follower shaft 35, a bearing member 36, a follower gear 30, and legs 37. The tray body 34 includes a circular bottom plate 34b, and an edge 34c which rises from the external periphery of the bottom plate 34b. The follower shaft 35 is fixed to the center of the lower face of the bottom plate 34b of the tray body 34. The follower gear 30 is fixed to the lower end of the follower shaft 35. In this way, the tray body 34 rotates integrally with the follower gear 30.

The bearing member 36 is a plate member whose shape is a circle, through the center of which the follower shaft 35 penetrates. The bearing member 36 can be moved in the axial direction of the follower shaft 35 and rotatably supports the follower shaft 35 at an arbitrary position of the follower shaft 35.

The leg 37 is provided in a plurality on the lower face of the bottom plate 34b of the tray body 34. The length of the leg 37 is set such that it is longer than the dimension from the lower face of the bottom plate 34b to the lower face of the follower gear 30 (the length of the follower shaft 35). The leg 37 can be folded such that it does not interfere with the bottom plate 10 of the drawing body 3 when the rotating tray 22 rotates. The rotating tray 22 may be provided with the leg 37 to pull out the leg 37 when the rotating tray 22 is removed from the drawing body 3 and stably place the rotation tray 22 on a kitchen table, for example.

In this way, the user may place food to be heated now onto the rotating tray 22 before mounting the rotating tray 22 to the drawing body 3. Alternatively, the user may place the rotating tray 22 with the heated food being placed, on the kitchen table. To realize such usage form, the rotating tray 22 does not necessarily have to be provided with the leg 37. The leg 37 may be a member body separate from the rotating tray that may be used only when adopting the usage form as described above.

Below, an operation and usage method of the cooking heater 1 will be described.

FIG. 4 is a lateral view illustrating the schematic configuration of the cooking heater 1 with the drawing body 3 being pulled out.

Figure 5:
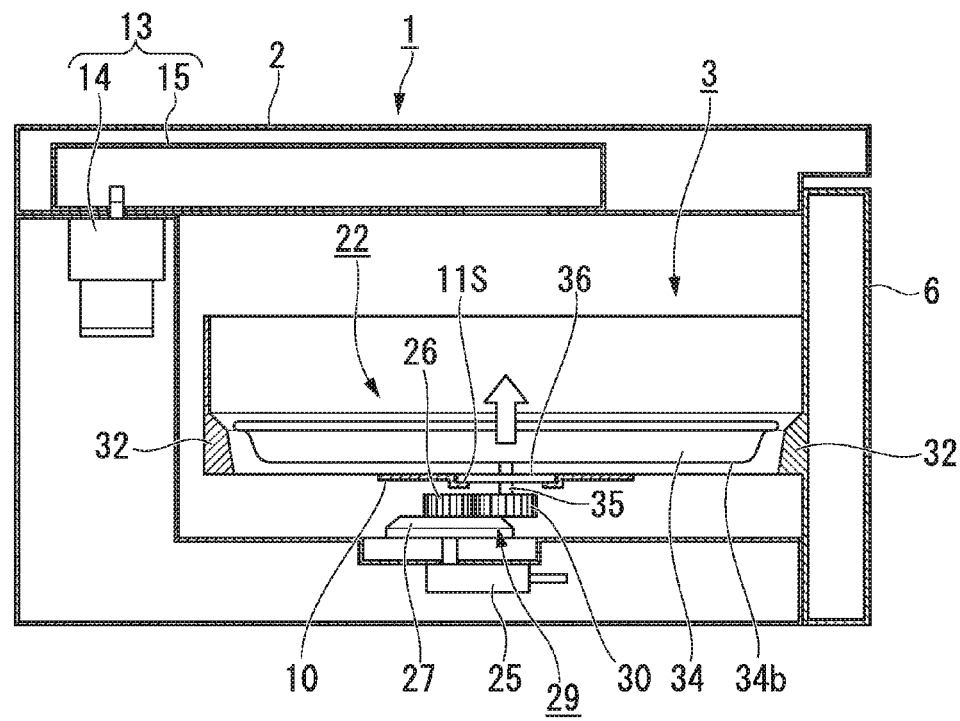

FIG. 5 is a lateral view illustrating the schematic configuration of the cooking heater 1 with the drawing body 3 being pushed in.

As shown in FIG. 4, with the drawing body 3 being pulled out of the cooking heater body 2, the user may remove the rotating tray 22 from the drawing body 3, or push the rotating tray 22 into the drawing body 3. Then, with the rotating tray 22 being pushed into the drawing body 3, the tray body 34 is supported by the bottom plate 10 of the drawing body 3. In other words, the bottom plate 34b of the tray body 34 is in contact with the bottom plate 10 of the drawing body 3. The bearing member 36 is in contact with the bottom plate 34b of the tray body 34 and is engaged into the step 11s of the bottom plate 10 of the drawing body 10. The drive gear 26 and the follower gear 30 are apart, so that the rotating tray 22 never rotates.

Next, when the drawing body 3 is pulled into the cooking heater body 2, the rotating tray 22 moves with the drawing body 3 and the follower gear 30 approaches the drive gear 26. As shown with a virtual line with a symbol T1 in FIG. 4, the lower face of the follower gear 30 is at the same height as that of the inclined face 27s of the support 27 of the drive gear 26, so that the follower gear 30 first comes into contact with the inclined face 27s of the support 27. When the follower gear 30 further approaches the drive gear 26 in this state, the follower gear 30 slides up along the inclined face 27s while being in contact with the inclined face 27s and rises to the height at which it engages with the follower gear 26.

As a result, as shown in FIG. 5, with the drawing body 3 being pushed into the cooking heater body 2, the follower gear 30 is engaged with the drive gear 26 with the follower gear 30 being supported by the support 27. Then, the tray body 34, which is integral with the follower gear 30 via the follower shaft 35, rises and floats over the bottom plate 10 of the drawing body 3. In this way, the rotating tray 22 smoothly rotates without the tray body 34 rubbing against the bottom plate 10. On the other hand, the bearing member 36 is still separated from the tray body 34 and engaged into the step 11s of the bottom plate 10 of the drawing body 3. Even at the position at which the rotating tray 22 has risen, the tray alignment guide 32 is at the position which is not in contact with the tray body 34. Thus, the tray alignment guide 32 does not prevent the rotating tray 22 from rotating.

When the rotating tray driving motor 25 rotates in the state illustrated in FIG. 5, the rotational force of the drive gear 26 is transmitted to the follower gear 30, so that the rotating tray 22 rotates. The bearing member 36 is engaged into the step 11s of the bottom plate 10 of the drawing body 3 to be fixed to the step 1is to cause the position of the follower shaft 35, which is the center of rotation of the rotating tray 22, to be fixed while the rotating tray driving motor 25 rotates. In this way, the state in which the drive gear 26 is engaged with the follower gear 30 may always be maintained to cause the rotating tray 22 to rotate smoothly.

According to the cooking heater 1 of the present embodiment, a user may remove the rotating tray 22 from the drawing body 3 to facilitate easy cleaning such as washing the whole rotating tray 22 even when heated food flows out of a container or dish to stain the rotating tray 22, for example. In this way, the user may hygienically use the coking heater 1.

Moreover, the user may bring a material to be heated in and out of the cooking heater 1 with the drawing body 3 being pulled out to the front face of the cooking heater body 2 to make the cooking heater 1 easy to use. Moreover, advantages may be obtained such as the ease of uniform heating with the cooking heater 1 being provided with the rotating tray 22. Moreover, it is not necessary to arrange a grill heater in the whole area over the heating chamber 4, making uniform cooking possible even when the grill heater is arranged over a part of the area. Furthermore, the size of the grill heater may be reduced to enhance the degree of freedom of arranging the other components.

Second Embodiment

Below, a second embodiment of the present invention is described using FIG. 6.

The basic features of the cooking heater according to the second embodiment are the same as those according to the first embodiment, with the rotation transmission mechanism being different.

Figure 6:
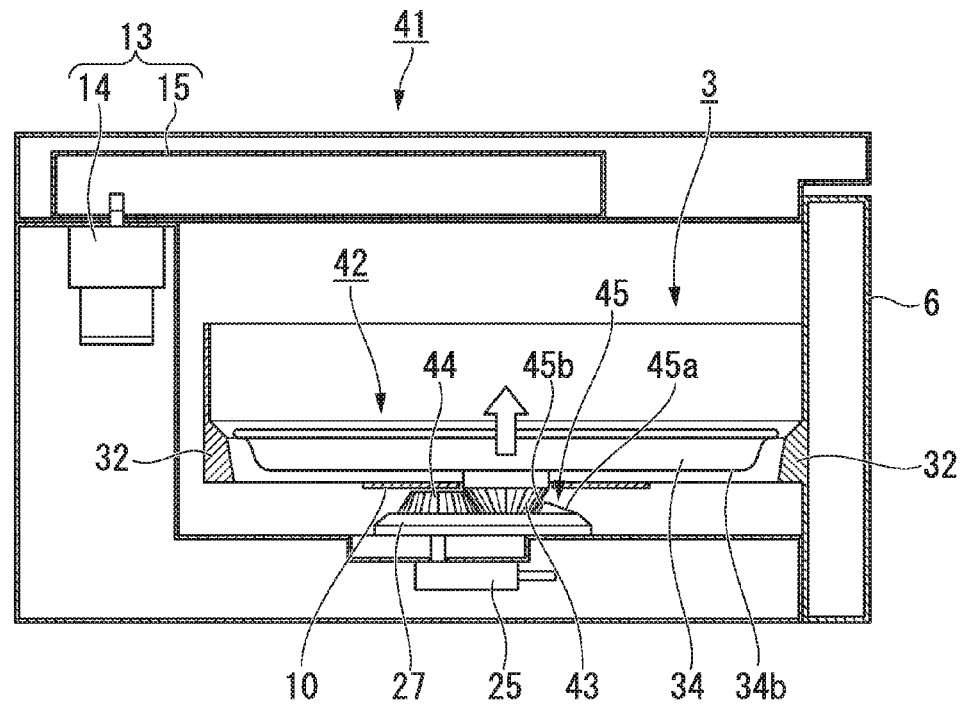
FIG. 6 is a perspective view illustrating the cooking heater according to a second embodiment.

FIG. 6 is a perspective view illustrating the cooking heater according to the second embodiment.

In FIG. 6, the same letters are given to elements which are common to those in FIG. 5 that are used in the first embodiment, so that repeated explanations will be omitted.

According to the first embodiment, the rotating tray includes the tray body, the follower shaft, the bearing member, and the follower gear. On the other hand, in a cooking heater 41 according to the present embodiment, as shown in FIG. 6, a rotating tray 42 includes a tray body 34 and a follower gear 43. The follower gear 43 is directly fixed to a bottom plate 34b of the tray body 34 to be integrated with the tray body 34. In this way, the rotating tray 42 does not necessarily have to include a follower shaft or a bearing member. However, a mechanism which keeps the center of rotation of the rotating tray 42 to be always at a constant position is provided to allow the rotating tray 42 to rotate without any difficulties.

According to the present embodiment, a drive gear 44 and the follower gear 43 are made from a bevel gear.

A projection 45 whose cross section is triangular is provided at a predetermined position on the side closer to the open/close door 6 on the upper face of the support 27. The triangle, which is the shape of the cross section of the projection 45, is a scalene triangle. Of two inclined faces 45a and 45b that are inclined relative to the upper face of the support 27, the slope of the inclined face 45a on the side closer to the open/close door 6 is smaller than the slope of the inclined face 45b on the side farther from the open/close door 6. This feature allows the follower gear 43 to easily get over the projection 45 when the drawing body 3 is inserted into the cooking heater body 2. When the rotating tray 42 is rotating, the movement of the follower gear 43 is regulated by the projection 45, maintaining the follower gear 43 being engaged with the drive gear 44. When the drawing body 3 is pulled out of the cooking heater 2, the follower gear 43 gets over the projection 45.

The other features are generally the same as those in the first embodiment. Operations of the cooking heater 41 are the same as those of the first embodiment.

Even in the present embodiment, advantages which are the same as those in the first embodiment may be obtained, such that a cooking heater may be provided, which includes both the drawing body and the rotating tray and which allows easily cleaning the rotating tray.

Third Embodiment

Below, a third embodiment of the present invention is described using FIG. 7.

The basic features of the cooking heater according to the third embodiment are the same as those according to the first embodiment, with the rotation transmission mechanism being different.

Figure 7:
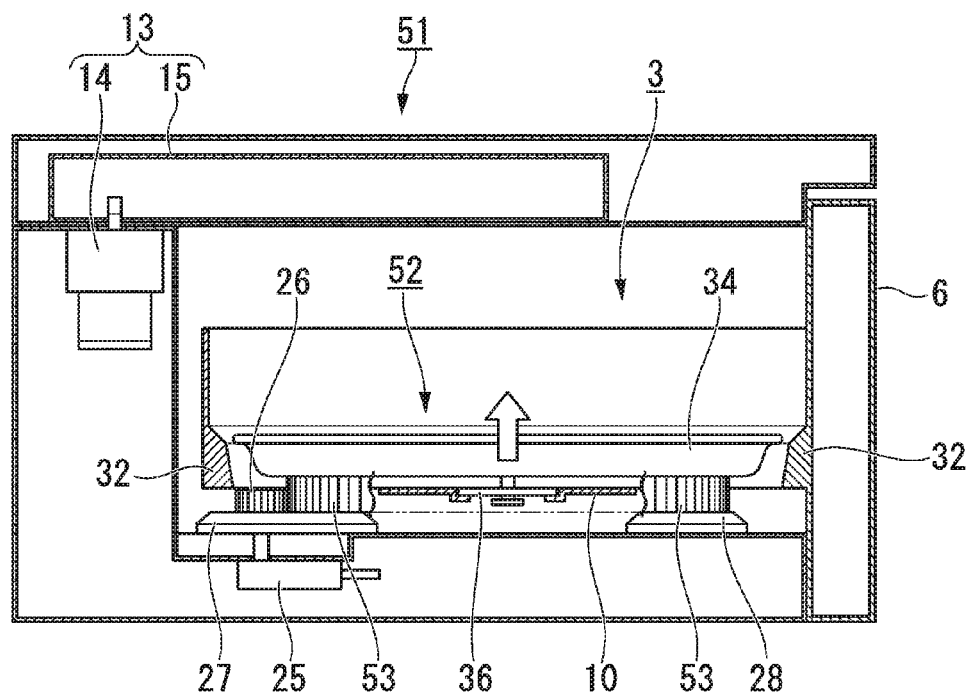
FIG. 7 is a perspective view illustrating the cooking heater according to a third embodiment.

FIG. 7 is a perspective view illustrating the cooking heater according to the third embodiment.

In FIG. 7, the same letters are given to elements which are common to those in FIG. 5 that are used in the first embodiment, so that repeated explanations will be omitted.

According to the first and second embodiments, the drive gear is generally arranged at the center of the heating chamber and engages with the follower gear, which is arranged at the center of the rotating tray. On the other hand, in a cooking heater 51 according to the present embodiment, as shown in FIG. 7, an annular follower gear 53 is provided along the external periphery of a rotating tray 52. The rotating tray driving motor 25 and the follower gear 26 are arranged at a position corresponding to the peripheral edge of the rotating tray 52. The lower face of the follower gear 53 is supported by the support 27 on the side farther from the open/close door 6 and the support 28 on the side closer to the open/close door 6. These supports 27 and 28 support the follower gear 53 to allow the follower gear 53 to rotate stably.

The other features are generally the same as those in the first embodiment. Operations of the cooking heater 51 are also the same as those in the first embodiment.

Even in the present embodiment, advantages which are the same as those in the first and second embodiments may be obtained, such that a cooking heater may be provided, which includes both the drawing body and the rotating tray and which allows easily cleaning the rotating tray. For the present embodiment, the annular follower gear 53 also has a function of the leg, so that the leg 37 such as that in the first embodiment doe not have to be provided.

Fourth Embodiment

Below, a fourth embodiment of the present invention is described using FIGS. 8-11.

The basic features of the cooking heater according to the fourth embodiment are the same as those according to the first embodiment, with the rotation transmission mechanism being different.

Figure 8:
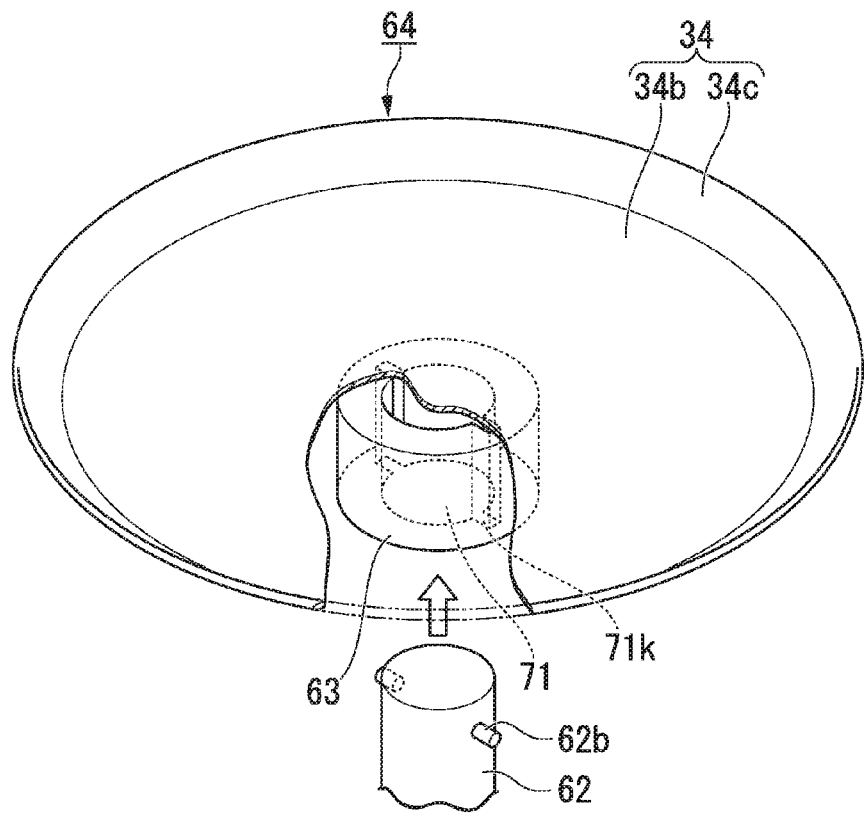
FIG. 8 is a perspective view illustrating the rotating tray in the cooking heater according to a fourth embodiment.

FIG. 8 is a perspective view illustrating the rotating tray in the cooking heater according to the fourth embodiment. For ease of viewing, a part of the tray body is shown broken in FIG. 8.

Figure 9:
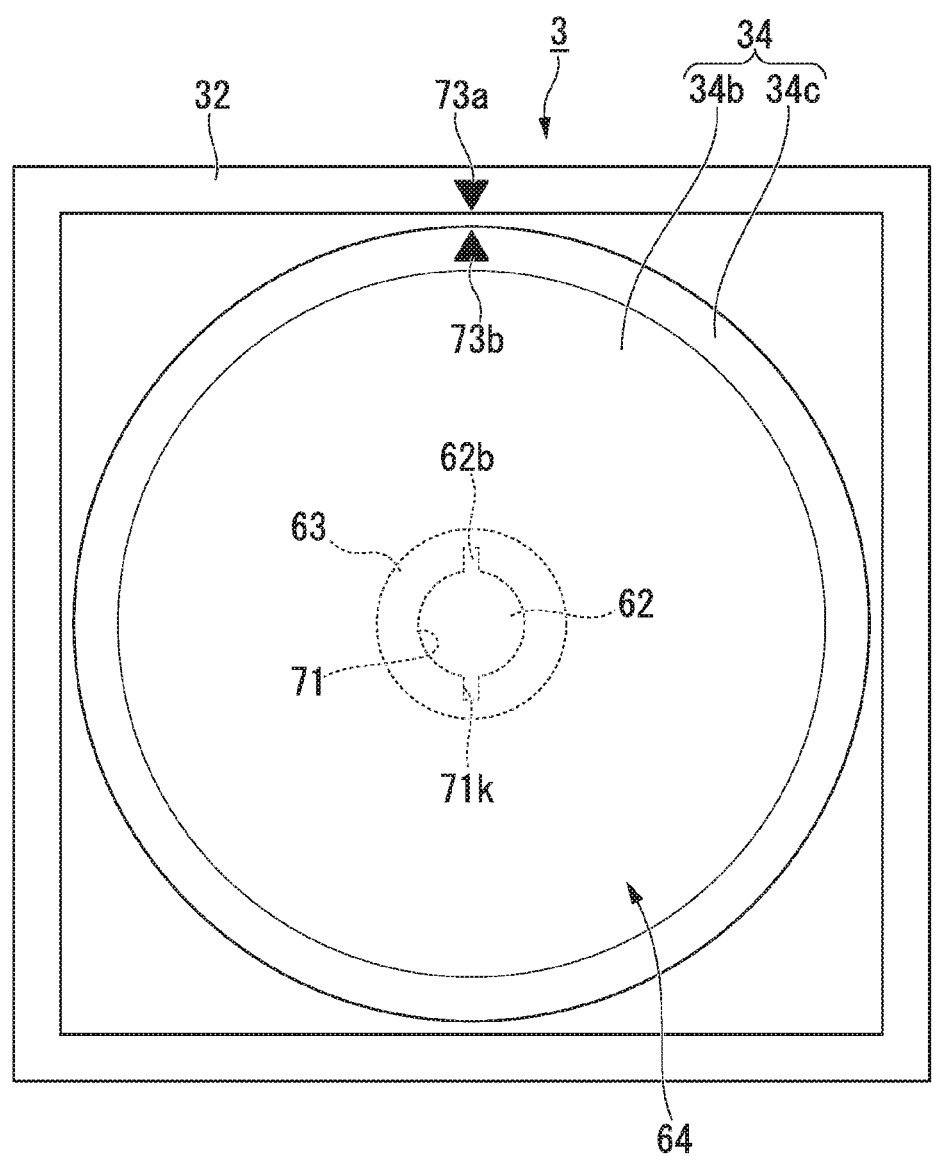
FIG. 9 is a plan view illustrating the rotating tray and the drawing body of the cooking heater.

FIG. 9 is a plan view illustrating the rotating tray and the drawing body of the cooking heater.

Figure 10:
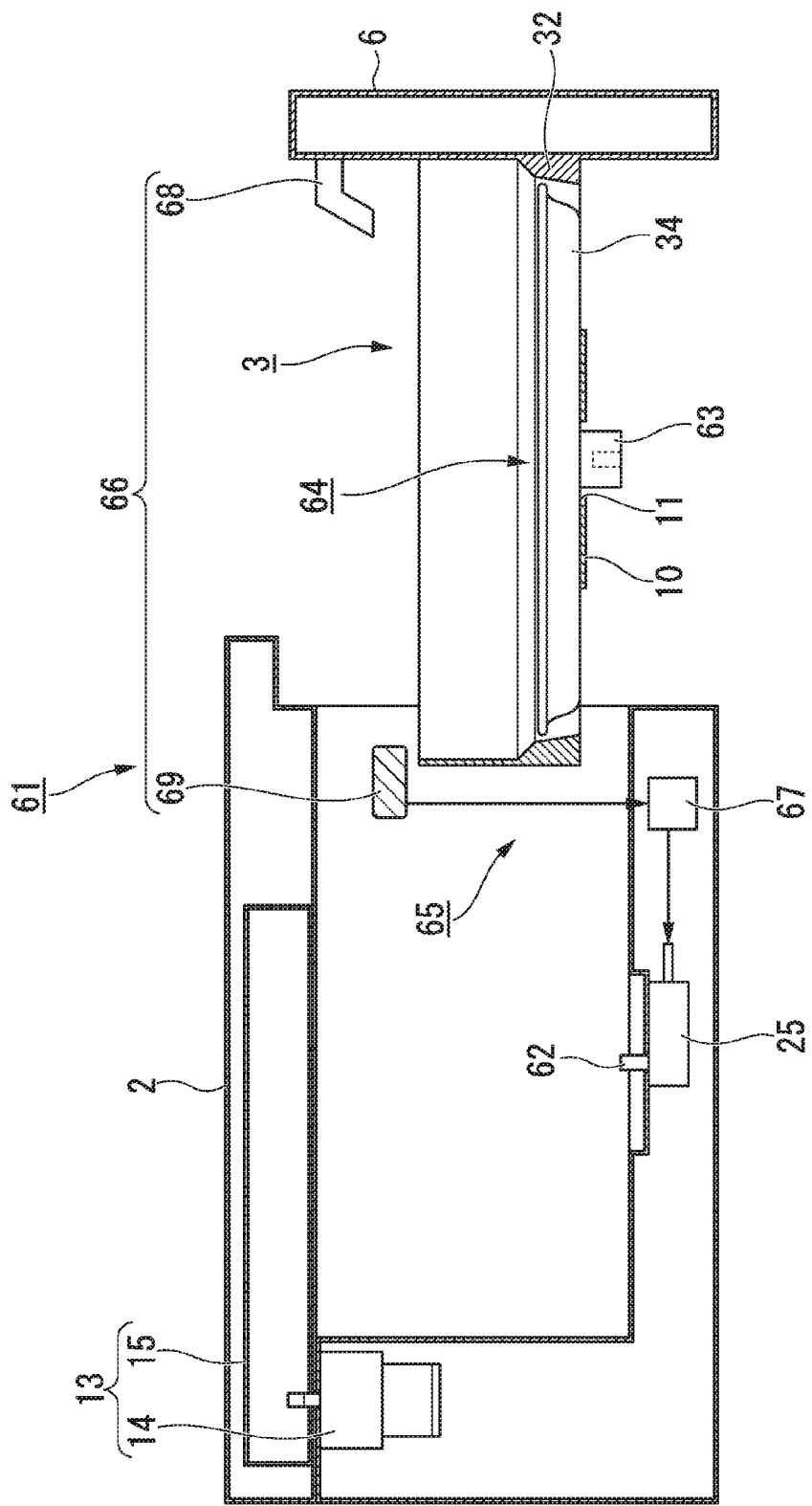
FIG. 10 is a cross-sectional diagram illustrating the cooking heater with the drawing body being pulled out.

FIG. 10 is a cross-sectional diagram of the cooking heater with the drawing body being pulled out.

Figure 11:
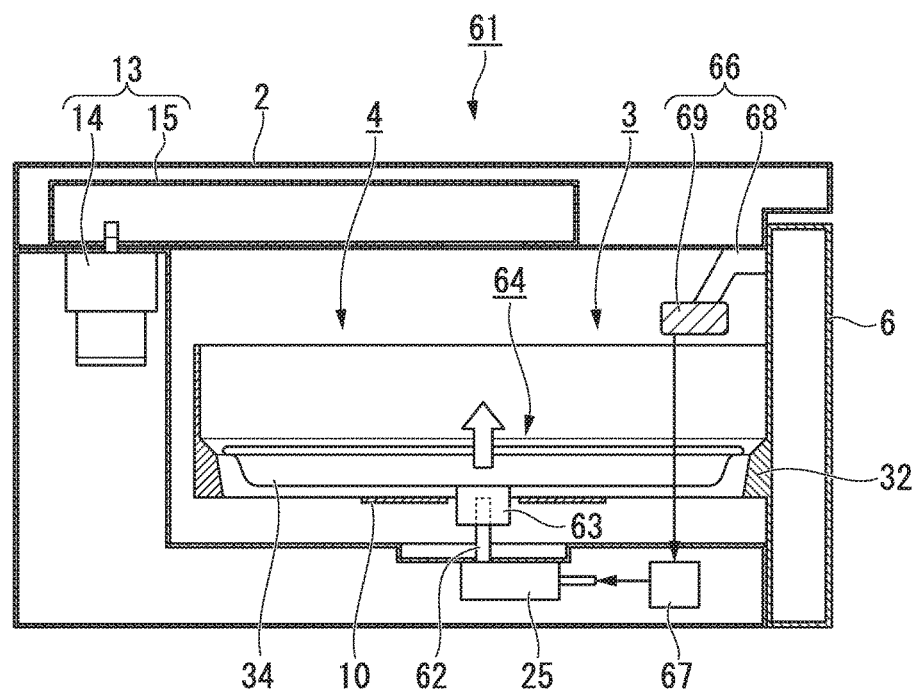

FIG. 11 is a cross-sectional diagram illustrating the cooking heater with the drawing body being pushed in.

In FIGS. 8-11, the same letters are given to elements which are common to those in figures used in the first embodiment, so that detailed explanations will be omitted.

While the rotation transmission mechanism in the first to third embodiments includes the drive gear and the follower gear, the rotation transmission mechanism in the fourth embodiment includes a drive shaft, a follower shaft, and a clutch mechanism. The clutch mechanism is for switching between connecting the drive shaft and the follower shaft, and disconnecting the drive shaft from the follower shaft.

As shown in FIGS. 10-11, a drive shaft 62 is connected to the rotating tray driving motor 25 and can be moved forward and backward in the axial direction (upward and downward). A follower shaft 63 is connected to the tray body 34 of a rotating tray 64. A clutch mechanism 65 includes a detector 66 which detects that the drawing body 3 is being pushed in and a controller 67 which controls operations of the drive shaft 62 in accordance with detection results of the detector 66. The detector 66 includes a latch lever 68 which is provided on the face on the heating chamber 4 side of the open/close door 6. The controller 67 controls forward and backward moving operations of the drive shaft 62 such that the drive shaft 62 is connected to the follower shaft 63 with the drawing body 3 being pushed in and the drive shaft 62 is disconnected from the follower shaft 63 with the drawing body 3 being pulled out.

As shown in FIG. 8, the follower shaft 63 is provided on the lower face of the bottom plate 34b of the tray body 34. A bore 71 having a diameter such that the drive shaft 62 may be inserted thereinto is provided at the center of the follower shaft 63. The drive shaft 62 rises to cause the drive shaft 62 to be inserted into the bore 71 of the follower shaft 63, and the follower shaft 63 and the drive shaft 62 to be mutually connected.

As shown in FIG. 10, a bore 11 having a size which is sufficient for inserting therethrough the follower shaft 63 is provided.

As shown in FIG. 8, a boss 62b which extends in the horizontal direction is provided in a part to be inserted to the bore 71 of the follower shaft 63, of the follower shaft 63. In correspondence therewith, a notch 71k into which the boss 62b is inserted is provided in the bore 71 of the follower shaft 63. The drive shaft 62 is inserted into the bore 71 of the follower shaft 63 at the position at which the boss 62b is inserted into the notch 71k. This feature ensures that the rotation of the drive shaft 62 be transmitted to the follower shaft 63 without only the drive shaft 62 idling rotating when the drive shaft 62 rotates.

As shown in FIG. 9, the position at which the drive shaft 62 stops rotating is controlled such that the boss 62b of the drive shaft 62 is located in the forward-backward direction of the drawing body 3 when the drawing body 3 moves. In the tray alignment guide 32 on the rear face side of the drawing body 3, a body-side alignment mark 73a is provided in correspondence with the position at which the boss 62b of the drive shaft 62 stops. Moreover, in an edge portion 34c of the tray body 34, a tray-side alignment mark 73b is provided in correspondence with the position of the notch 71k of the follower shaft 63. A user mounts the rotating tray 64 to the drawing body 3 such that the body side alignment mark 73a is aligned with the tray side alignment mark 73b. In this way, the drive shaft 62 rises right from the position at which the rotation stops to be inserted into the bore 71 of the follower shaft 63.

Below, operations and usage methods of the cooking heater 61 are described.

As shown in FIG. 10, with the drawing body 3 being pulled out of the cooking heater body 2, a user may remove the rotating tray 64 from the drawing body 3 or mount the rotating tray 64 to the drawing body 3. As described above, when the rotating tray 64 is mounted to the drawing body 3, the body side alignment mark 73 and the tray side alignment mark 73b are aligned. When the rotating tray 64 is mounted to the drawing body 3, the tray body 34 is supported by the bottom plate 10 of the drawing body 3. Then, a latch lever 68 of the detector 66 is away from a micro switch 69 which is off. The controller 67 determines that the drawing body 3 is being pulled out of the cooking heater body 2.

As shown in FIG. 11, with the drawing body 3 being pushed into the cooking heater body 2, the latch lever 68 pushes the micro switch 69 to turn it on. Then, the controller 67 determines that the drawing body 3 is pushed into the cooking heater 2 itself. Then, a signal from the controller 67 raises the drive shaft 62 and causes the drive shaft 62 to be connected to the follower shaft 63. Then, the drive shaft 62, together with the follower shaft 63, raises the tray body 34 and pushes up the tray body 34 until the tray body 34 floats over the bottom plate 10 of the drawing body 3. In this way, the tray body 34 and the bottom plate 10 never rub each other. In the state shown in FIG. 11, when the rotating tray driving motor 25 rotates, the rotational force of the drive shaft 62 is transmitted to the follower shaft 63, rotating the rotating tray 64.

While the detector 66, which includes the latch lever 68 and the micro switch 69, are used in the present embodiment, it is not limited thereto, so that other detection means such as an optical sensor, for example, may be used as long as they may detect whether the drawing body 3 is at the position at which it is being pulled out, or at the position at which it is being pushed in.

Even in the present embodiment, advantages which are the same as those in the first to third embodiments may be obtained, such that a cooking heater may be provided, which includes both the drawing body and the rotating tray and which allows easily cleaning the rotating tray.

While a configuration is adopted in which a user conducts alignment between the boss 62b of the drive shaft 62 and the notch 71k of the follower shaft 63 in the present embodiment, instead of the above-mentioned configuration, a configuration in which alignment is conducted automatically on the apparatus side may be adopted. More specifically, a configuration may be adopted in which, when the detector 66 detects that the drawing body 3 is pushed into the cooking heater body 2, a position is searched for at which the boss 62b is inserted into the notch 71k while the drive shaft 62 rotates and after an optimal position is found, the drive shaft 62 rises. With this configuration, the user may place the rotating tray 64 without taking into account the orientation of the rotating tray 64 when the rotating tray 64 is mounted to the drawing body 3. Then, the alignment marks 73a and 73b of the rotating tray 64 become unnecessary.

Besides providing the alignment marks 73a and 73b, alignment may be conducted on the apparatus side to improve the accuracy of alignment.

Fifth Embodiment

Below, a fifth embodiment of the present invention is described using FIGS. 12 and 13.

The basic features of the cooking heater according to the fifth embodiment are the same as those according to the first embodiment, with the rotating tray driving motor to move with the drawing body being different.

Figure 12:
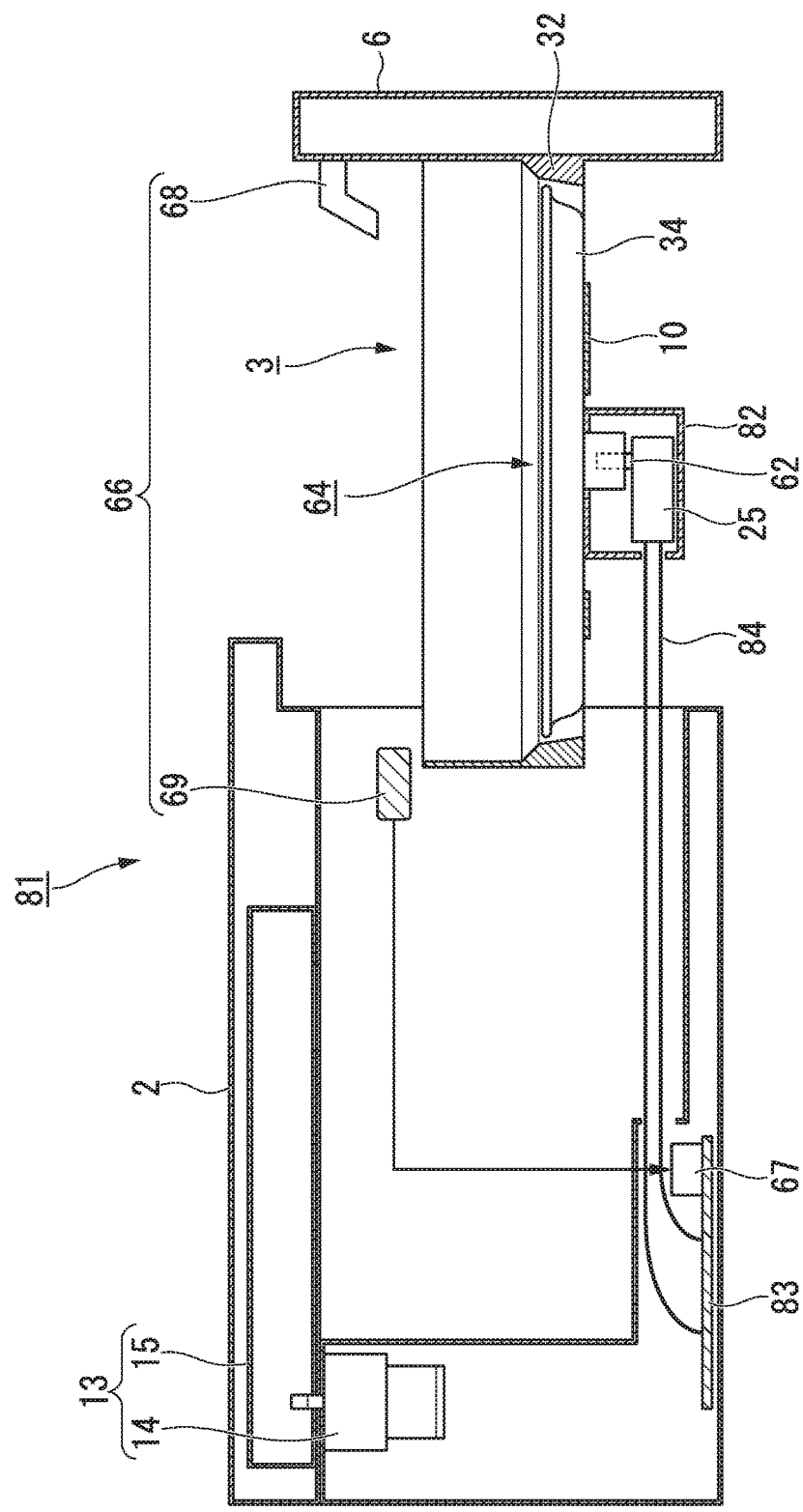
FIG. 12 is a cross-sectional diagram illustrating the cooking heater according to a fifth embodiment, with the drawing body being pulled out.

FIG. 12 is a cross-sectional diagram illustrating the cooking heater with the drawing body being pulled out.

Figure 13:
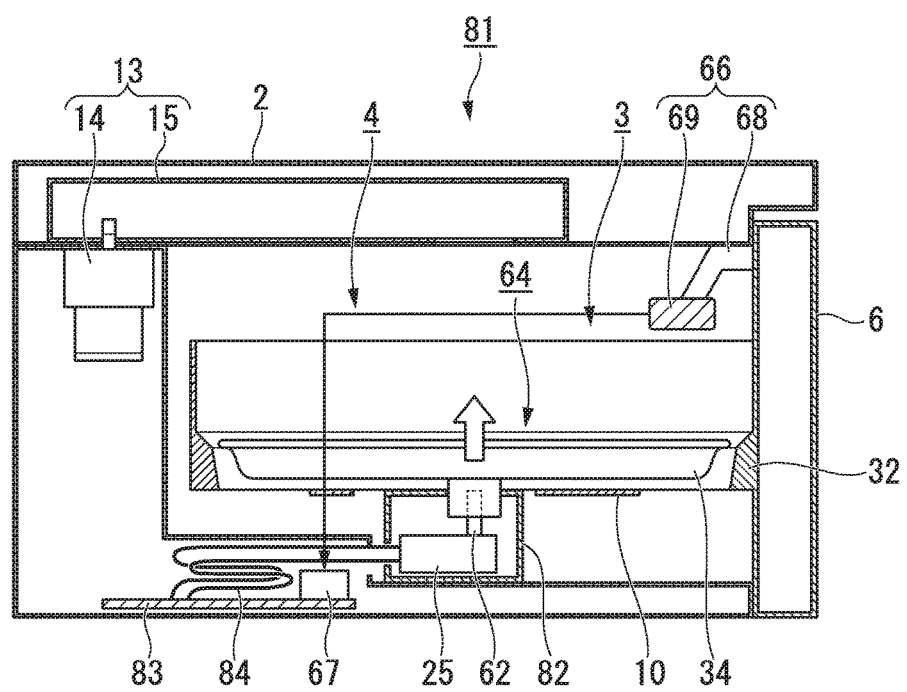

FIG. 13 is a cross-sectional diagram illustrating the heating cooker with the drawing body being pushed in.

In FIGS. 12 and 13, the same letters are given to elements which are common to those in figures used in the first embodiment, so that detailed explanations will be omitted.

While the rotating tray driving motor according to the first to fourth embodiments are fixed to the cooking heater body, the rotating tray driving motor according to the fifth embodiment moves with the drawing body. In other words, the cooking heater according to the present embodiment is configured to be movable with a cooking heater body which includes a heating chamber; a drawing body which can be pushed into the cooking heater body and pulled out of the cooking heater body; a rotating tray which is arranged inside the drawing body; and a rotation drive source which can move with the drawing body and which rotates the rotation tray.

In a cooking heater 81 according to the present embodiment, as shown in FIGS. 12 and 13, the rotating tray driving motor 25 is fixed to the lower portion of the drawing body 3. For the present embodiment, with the drawing body 3 being pushed in as shown in FIG. 13, the rotating tray driving motor 25 is located inside the heating chamber 4. Therefore, a microwave shielding member 82 for suppressing the impact of microwaves on the rotating tray driving motor 25 is provided in the surrounding of the rotating tray driving motor 25. The microwave shielding member 82 is made from a metal mesh having a bore which is sufficiently smaller than the wavelength of microwaves, for example.

A control substrate 83 on which is mounted a drive circuit (not shown) of the rotating tray driving motor 25 is provided in the cooking heater body 2. The rotating tray driving motor 25 and the drive circuit are connected via a feed line 84. It is desired that the feed line 84 be wound spirally, for example, and be easily be extendable and compressible. Power and signals from the drive circuit are fed to the rotating tray driving motor 25 via the feed line 84. In the same manner as the fourth embodiment, the latch lever 68 and the micro switch 69 are provided as the detector 66 which detects whether the drawing body 3 is at the pulled-out position or at the pushed-in position.

Below, operations and usage methods of the cooking heater 81 are described.

As shown in FIG. 12, with the drawing body 3 being pulled out of the heater body 2, the user may remove the rotating tray 64 from the drawing body 3 and mount the rotating tray 64 to the drawing body 3. With the rotating tray 64 being mounted to the drawing body 3, the tray body 34 is supported by the bottom plate 10 of the drawing body 3. Then, the latch lever 68 of the detector 66 is away from the micro switch 69, and the micro switch 69 is being turned off. The controller 67 determines that the drawing body 3 is being pulled out of the cooking heater body 2, so that feeding to the rotating tray drive motor 25 is not performed. The rotating tray driving motor 25 is being pulled out to the outside of the cooking heater body 2 with the rotating tray 64.

As shown in FIG. 13, when the drawing body 3 is pushed into the cooking heater body 2, the latch lever 68 pushes the micro switch 69 to turn on the micro switch 69. Then, the controller 67 determines that the drawing body 3 is being pushed into the cooking heater body 2. Here, a signal from the controller 67 causes the drive shaft 62 to raise the tray body 34, so that the tray body 34 floats from the bottom plate 10 of the drawing body 3. This prevents the tray body 34 to rub with the bottom plate 10 at the time of rotation. In the state shown in FIG. 13, rotating of the rotating tray drive motor 25 causes the rotating tray 64 to rotate. With the operation in which the drawing body 3 is pushed into the cooking heater 2, the feed line 84 is pushed into the cooking heater body 2. The feed line 84 is desirably coated, or shielded by the rotating tray driving motor 25, so as not to be impacted by microwaves.

While the detector 66, which includes the latch lever 68 and the micro switch 69, are used for the present embodiment, the configuration is not limited thereto, so that any other detection means such as an optical sensor, etc., for example, may be used as long as it can detect that the drawing body 3 is at the pulled-out position or the pushed-in position.

Even in the present embodiment, advantages which are the same as those in the first to fourth embodiments may be obtained, such that a cooking heater may be provided, which includes both the drawing body and the rotating tray and which allows easily cleaning the rotating tray. Moreover, in the cooking heater 81, the rotating tray driving motor 25 may move with the drawing body 3, so that there is no need to include a rotation transmission mechanism which can switch between connecting and disconnecting in conjunction with the moving of the drawing body 3. Therefore, the apparatus configuration of the cooking heater 81 may be simplified.

While the rotating tray 64 can be mounted to and removed from the drawing body 3 in the present embodiment, it is not necessary that the rotating tray 64 is configured to be allowed to be mounted to and removed from the drawing body 3. Moreover, while the controller 67 is configured to detect that the drawing body 3 is at the pushed-on position and raise the rotating tray 64 from the bottom plate 10 based on detection results, the rotating tray 64 may also be configured to be always at the raised position regardless of whether the drawing body 3 is at the pushed-in position.

Sixth Embodiment

Below, a sixth embodiment of the present invention is described using FIGS. 14 and 15.

The basic features of the cooking heater according to the sixth embodiment are the same as those according to the fifth embodiment, with the electrical connecting structure between the rotating tray driving motor and the control substrate being different.

Figure 14:
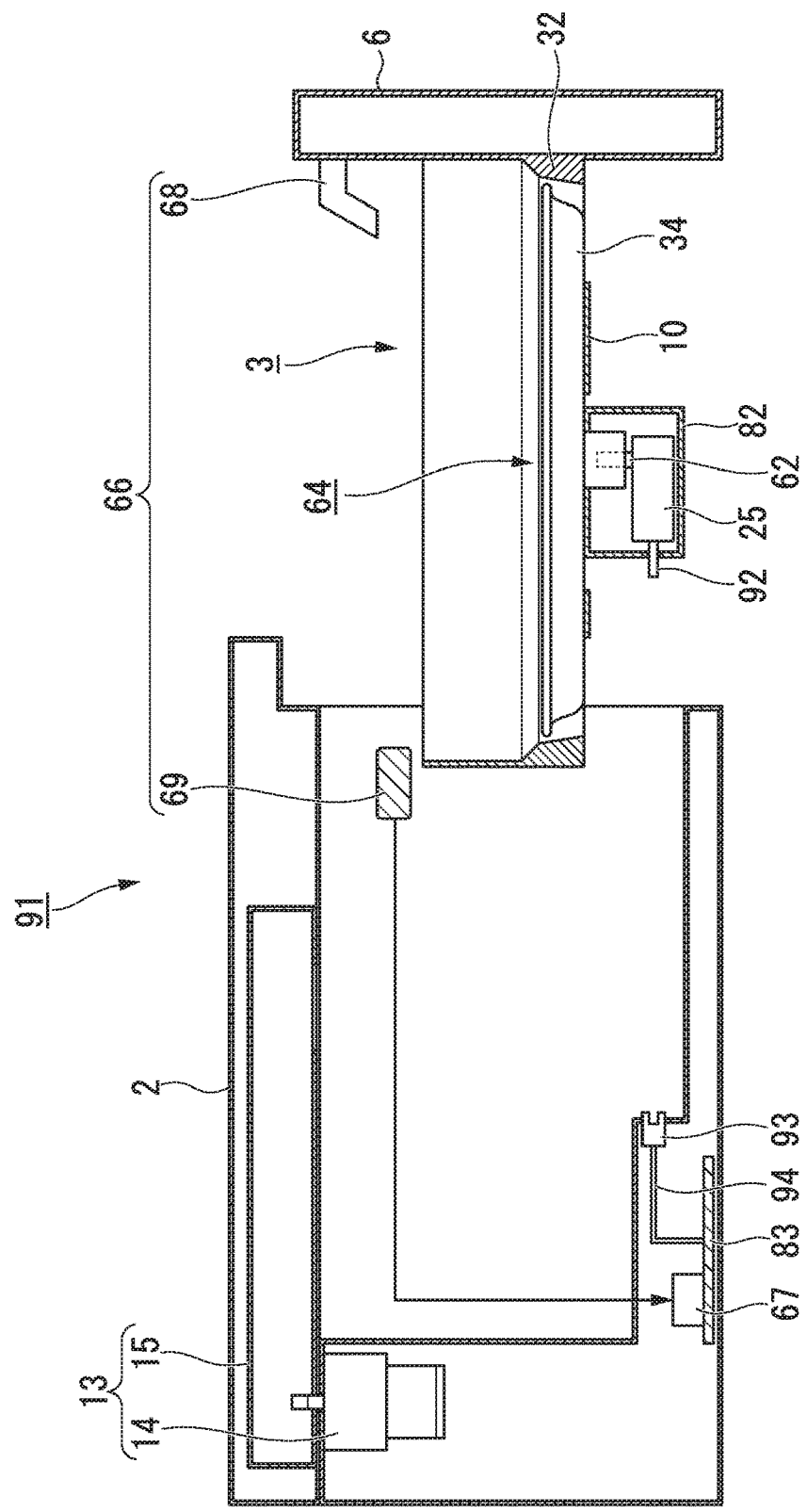
FIG. 14 is a cross-sectional diagram illustrating the cooking heater according to a sixth embodiment, with the drawing body being pulled out.

FIG. 14 is a cross-sectional diagram illustrating the cooking heater, with the drawing body being pulled out.

Figure 15:
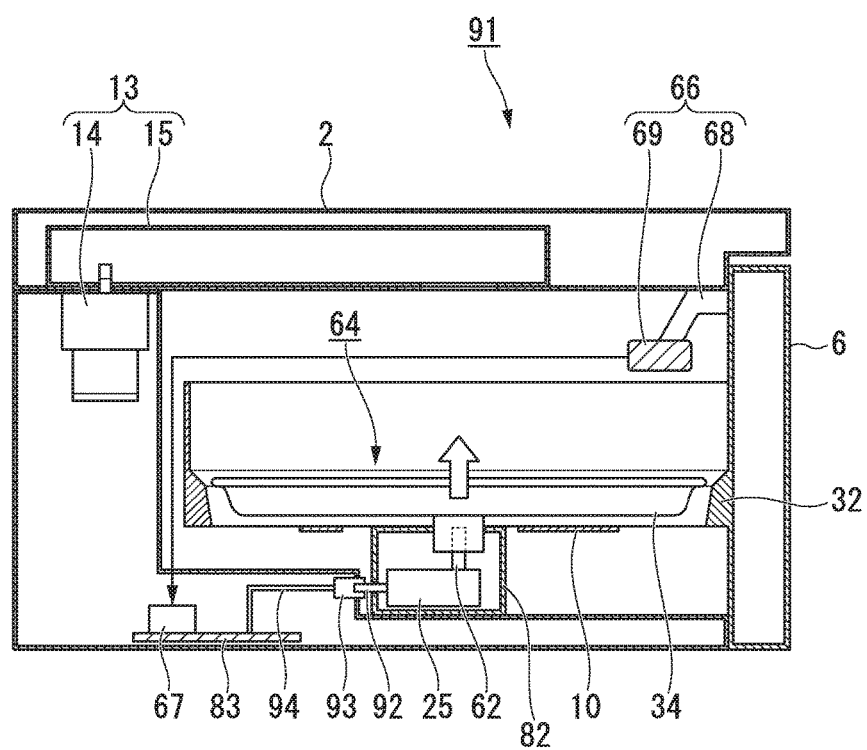

FIG. 15 is a cross-sectional diagram illustrating the cooking heater, with the drawing body being pushed in.

In FIGS. 14 and 15, the same letters are given to elements which are common to those in FIGS. 12 and 13 that are used in the fifth embodiment, so that repeated explanations will be omitted.

In a cooking heater 91 according to the present embodiment, as shown in FIG. 14, a feed line terminal 92 is provided in the rotation tray driving motor 25. A connector 93 which is connected to the feed line 94 is provided at the position corresponding to a feed terminal 92 in the cooking heater body 2.

As shown in FIG. 14, with the drawing body 3 being pulled out of the cooking heater body 2, the rotating tray driving motor 25 is located outside the cooking heater body 2, with the rotating tray 64. Then, the feed terminal 92 and the connector 93 are not electrically connected. As shown in FIG. 15, when the drawing body 3 is pushed into the cooking heater body 2, the feed terminal 92 approaches the connector 93, with the drawing body 3, and the feed terminal 92 and the drawing body 93 not being electrically connected. As shown in FIG. 15, when the drawing body 3 is pushed into the cooking body 2, the feed terminal 92 approaches the connector 93 with the drawing body 3 and the feed terminal 92 and the connector 93 are electrically connected with the feed terminal 92 and the connector 93 being engaged with each other. The other operations are the same as those in the fifth embodiment.

Even in the present embodiment, advantages which are the same as those in the first to fifth embodiments may be obtained, such that a cooking heater may be provided, which includes both the drawing body and the rotating tray and which allows easily cleaning the rotating tray. Moreover, in the cooking heater 91 of the present embodiment, the need for a feed line which moves with movement of the drawing body 3 is eliminated, making it possible to further simplify the apparatus configuration of the cooking heater compared to that in the fifth embodiment.

The technical scope of the present invention is not limited to the above-described embodiments, so that various changes may be incorporated thereinto without departing from the gist of the present invention.

For example, while an example is provided of a rotation transmission mechanism using a drive gear and a follower gear in the first to third embodiments, it is not limited to a rotation transmission mechanism using gears, so that a rotation transmission mechanism using a pair of circular plates that transmit rotation by friction, for example, may be used. Alternatively, a non-contact type rotation transmission mechanism which transmits rotation by magnetic force, etc., may be used. Moreover, a rotating tray does not have to rotate continuously in one direction, so that a reciprocating motion in which forward and reverse rotations are mutually repeated may be performed. In addition, specific configurations such as the number, arrangement, and shape, etc., of various features which make up the cooking heater are not limited to the above-described embodiments, so that appropriate changes can be made thereto.

INDUSTRIAL APPLICABILITY

The present invention may be applied to cooking heaters such as microwave ovens.

DESCRIPTION OF REFERENCE NUMERALS

1, 41, 51, 61, 81, 91 Cooking heater
2 Cooking heater body
3 Drawing body
4 Heating chamber
10 Bottom plate
22, 42, 52, 64 Rotating tray
25 Rotating tray driving motor (rotation drive source)
26, 44 Drive gear
27 Support
29 Rotation transmission mechanism
30, 43, 53 Follower gear
32 Tray alignment guide (position regulating member)
35, 63 Follower shaft
36 Bearing member
37 Leg
62 Drive shaft
65 Clutch mechanism
66 Detector
67 Controller

The invention claimed is:

1. A cooking heater, comprising:
a cooking heater body which includes a heating chamber;
a drawing body which is configured to be allowed to be pulled out from the cooking heater body and pushed into the cooking heater body;
a rotating tray which is arranged inside the drawing body and which is configured to be allowed to be mounted to the drawing body and removed from the drawing body, the rotating tray including a follower shaft and a follower gear mounted to the follower shaft;
a motor which is provided in the cooking heater body, the motor including a drive shaft and a drive gear mounted to the drive shaft; and
a rotation transmission mechanism that:

in a case that the drawing body is pushed into the cooking heater body and in a case that the drive gear and the follower gear are engaged with each other, directly transmits rotational force from the motor to the rotating tray, and in a case that the drawing body is pulled out of the cooking heater body, blocks the transmission of the rotational force to the rotating tray.

2. The cooking heater as claimed in claim 1, wherein the rotating tray is configured to be allowed to be raised and lowered in cooperation with a pulling-out operation and a pushing-in operation of the drawing body.

3. The cooking heater as claimed in claim 2, wherein, with the drawing body being pulled out of the cooking heater body, the rotating tray is in contact with a bottom plate of the drawing body; and, with the drawing body being pushed into the cooking heater body, the rotating tray is disposed above the bottom plate.

4. The cooking heater as claimed in claim 1, wherein the drive gear includes a support which includes an inclined face, and the follower gear is configured to be raised to a height at which the follower gear engages with the drive gear while being in contact with the inclined face in conjunction with the pushing-in operation of the drawing body.

5. The cooking heater as claimed in claim 1, wherein the rotating tray further includes a bearing member which rotatably supports the follower shaft, and the bearing member is supported by the bottom plate of the drawing body.

6. The cooking heater as claimed in claim 1, wherein the rotation transmission mechanism includes a clutch mechanism which switches between connecting and disconnecting of the drive shaft and the follower shaft, and the drive shaft and the follower shaft are mutually connected with the drawing body being pushed into the cooking heater body.

7. The cooking heater as claimed in claim 6, wherein the clutch mechanism includes a detector which detects that the drawing body is being pushed into; and a controller which controls an operation of the drive shaft such as to connect the drive shaft to the follower shaft with the drawing body being pushed into in accordance with detection results of the detector.

8. The cooking heater as claimed in claim 1, wherein the drawing body includes a position regulating member which regulates a position of the rotating tray relative to the drawing body.

9. The cooking heater as claimed in claim 1, wherein the rotating tray includes legs which project from the bottom face of the rotating tray.

10. The cooking heater as claimed in claim 9, wherein the legs are foldable.

11. The cooking heater as claimed in claim 1, wherein the follower shaft is parallel to the drive shaft, and the follower shaft and the drive shaft do not exist at a same straight line.

12. The cooking heater as claimed in claim 1, wherein the motor does not comprise a circular plate member which transmits, to the rotating tray, a rotational force from the motor by placing the rotating tray on the circular plate member.

13. A cooking heater, comprising:

a cooking heater body which includes a heating chamber;

a drawing body which is configured to be allowed to be pulled out of the cooking heater body and pushed into the cooking heater body;

a rotating tray which is arranged inside the drawing body and which is configured to be allowed to be mounted to the drawing body and removed from the drawing body, the rotating tray including a follower shaft;

a motor which is provided in the cooking heater body, the motor including a drive shaft; and a controller which controls an input to the motor and switches rotating of the rotating tray, wherein the motor directly transmits a rotational drive force to the rotating tray in a case that the drawing body is pushed into the cooking heater body and in a case that the drive shaft and the follower shaft are connected with each other, and the rotating tray is configured to not rotate in a case that the drawing body is pulled out of the cooking heater body.

* * * * *